(12) United States Patent
Rico Alvarino et al.

(10) Patent No.: US 12,550,150 B2
(45) Date of Patent: Feb. 10, 2026

(54) DYNAMIC SPECTRUM SHARING PHYSICAL DOWNLINK CONTROL CHANNEL ENHANCEMENT

(71) Applicant: QUALCOMM Incorporated, San Diego, CA (US)

(72) Inventors: Alberto Rico Alvarino, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 886 days.

(21) Appl. No.: 17/354,928

(22) Filed: Jun. 22, 2021

(65) Prior Publication Data

US 2022/0408467 A1    Dec. 22, 2022

(51) Int. Cl.
*H04W 72/23* (2023.01)
*H04W 72/044* (2023.01)
*H04W 72/1263* (2023.01)

(52) U.S. Cl.
CPC ....... *H04W 72/23* (2023.01); *H04W 72/0466* (2013.01); *H04W 72/1263* (2013.01)

(58) Field of Classification Search
None
See application file for complete search history.

(56) References Cited

U.S. PATENT DOCUMENTS

| | | | |
|---|---|---|---|
| 9,025,538 B2 * | 5/2015 | Dai .......................... | H04B 7/06 370/329 |
| 11,627,470 B1 * | 4/2023 | Gronstad .............. | H04W 16/10 370/329 |
| 2011/0319025 A1 * | 12/2011 | Siomina ................ | H04B 7/0617 455/63.1 |
| 2013/0114766 A1 * | 5/2013 | Mueller-Weinfurtner .................... | H04L 1/0054 375/341 |
| 2014/0071934 A1 * | 3/2014 | Frenne ................ | H04L 27/2627 370/329 |
| 2014/0126485 A1 * | 5/2014 | Chen ....................... | H04L 5/001 370/328 |
| 2014/0161094 A1 * | 6/2014 | Ro ......................... | H04L 5/0055 370/329 |
| 2015/0245379 A1 * | 8/2015 | Nguyen ................... | H04W 4/70 370/329 |
| 2016/0119928 A1 * | 4/2016 | Wu .................... | H04W 72/0453 370/329 |
| 2017/0332359 A1 * | 11/2017 | Tsai ..................... | H04B 7/0617 |
| 2019/0379404 A1 * | 12/2019 | Blankenship ......... | H04L 1/0061 |
| 2020/0053743 A1 * | 2/2020 | Cheng .................... | H04W 4/40 |

(Continued)

FOREIGN PATENT DOCUMENTS

| CN | 107733483 B | * 12/2020 | ............. H04L 1/06 |
|---|---|---|---|
| CN | 113424616 A | * 9/2021 | ........... H04W 72/53 |

(Continued)

*Primary Examiner* — Andrew C Oh
(74) *Attorney, Agent, or Firm* — Harrity & Harrity, LLP

(57) ABSTRACT

A shared control region is provided for enhanced dynamic spectrum sharing between a first radio access technology (e.g., LTE) and a second radio access technology (e.g., NR). The shared control region is resource element mapped according to a resource element mapping for the first radio access technology (RAT) and includes pilot signals for the first RAT. The shared control region also includes control information for a user equipment in the second RAT.

12 Claims, 12 Drawing Sheets

(56) References Cited

U.S. PATENT DOCUMENTS

| | | | | |
|---|---|---|---|---|
| 2020/0059249 | A1* | 2/2020 | Shieh | H03M 13/271 |
| 2020/0067685 | A1* | 2/2020 | Awad | H04L 5/0007 |
| 2020/0220681 | A1* | 7/2020 | Yang | H04L 5/001 |
| 2021/0259000 | A1* | 8/2021 | Khoshnevisan | H04L 5/0048 |
| 2022/0311576 | A1* | 9/2022 | Sun | H04L 27/2602 |
| 2022/0312452 | A1* | 9/2022 | Frenne | H04L 5/005 |
| 2022/0329300 | A1* | 10/2022 | Wang | H04W 24/10 |
| 2022/0386342 | A1* | 12/2022 | Takeda | H04L 5/0048 |
| 2022/0408467 | A1* | 12/2022 | Rico Alvarino | H04W 72/1263 |
| 2023/0413289 | A1* | 12/2023 | Lei | H04W 72/232 |

FOREIGN PATENT DOCUMENTS

| | | | | |
|---|---|---|---|---|
| CN | 110731071 B | * | 9/2022 | H04L 27/2602 |
| KR | 20210149573 A | * | 12/2021 | H04L 5/0091 |
| KR | 102378916 B1 | * | 3/2022 | H04W 72/54 |
| KR | 20220078443 A | * | 6/2022 | H04W 72/0453 |
| KR | 20220140277 A | * | 10/2022 | H04W 72/23 |
| KR | 20220166545 A | * | 12/2022 | H04W 72/044 |
| WO | WO-2010150802 A1 | * | 12/2010 | H04L 27/26035 |
| WO | WO-2011032342 A1 | * | 3/2011 | H04B 7/0665 |
| WO | WO-2013069956 A1 | * | 5/2013 | H04W 72/23 |
| WO | WO-2014126514 A1 | * | 8/2014 | H04W 72/20 |
| WO | WO-2019058548 A1 | * | 3/2019 | H04L 27/261 |
| WO | WO-2020121413 A1 | * | 6/2020 | H04W 72/1289 |
| WO | WO-2021246653 A1 | * | 12/2021 | H04W 72/23 |

* cited by examiner

DYNAMIC SPECTRUM SHARING PHYSICAL DOWNLINK CONTROL CHANNEL ENHANCEMENT

TECHNICAL FIELD

The technology discussed below relates generally to wireless communication systems, and more particularly, to enhancement of a dynamic spectrum sharing physical downlink control channel.

BACKGROUND

Through the use of higher frequencies such as the C band or millimeter band, fifth generation (5G) new radio (NR) offers a higher data rate than fourth generation (4G) long term evolution (LTE). But propagation losses at these higher frequencies limits the cell size, which increases costs due to the need for a greater density of base stations to serve the smaller cells. It is thus advantageous for 5G to also use lower frequencies to provide wider coverage. But these lower frequency bands are already occupied by 4G networks. Dynamic spectrum sharing (DSS) allows a communication service provider to share the spectrum in an LTE network with an NR network.

SUMMARY

In accordance with an aspect of the disclosure, a method of wireless communication for a base station is provided that includes: using a resource element mapping for a first radio access technology to map a plurality of pilot signals of the first radio access technology to a first plurality of resource elements in a control region shared between the first radio access technology and a second radio access technology; using the resource element mapping for the first radio access technology to map encoded downlink control information for a user equipment associated with the second radio access technology to a second plurality of resource elements in the control region; and transmitting the first plurality of resource elements and the second plurality of resource elements to the user equipment.

In accordance with another aspect of the disclosure, a base station is provided that includes: a processor configured to control a mapping of a plurality of pilot signals according to a resource element mapping of a first radio access technology to a first plurality of resource elements in a control region shared between the first radio access technology and a second radio access technology and to control a mapping of encoded downlink control information for a user equipment associated with the second radio access technology to a second plurality of resource elements in the control region according to the resource element mapping for the first radio access technology; and a transceiver configured to transmit the first plurality of resource elements and the second plurality of resource elements to the user equipment.

In accordance with yet another aspect of the disclosure, a method of wireless communication for a user equipment is provided that includes: extracting resource elements in a received signal according to a resource element mapping of a first radio access technology to provide an extracted signal; and recovering downlink control information for the user equipment from the extracted signal, wherein the downlink control information schedules a physical downlink shared channel in a second radio access technology for the user equipment.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figure.

DETAILED DESCRIPTION

To provide enhanced DSS, the LTE control region is modified to also provide NR control. In this fashion, a separate NR control region is obviated to free up resources for NR data transmission. To provide a better appreciation of the DSS enhancements disclosed herein, some basic concepts in LTE and NR networks will first be discussed including the following definitions:

RAT: radio access technology. The type of technology or communication standard utilized for radio access and communication over a wireless air interface. Just a few examples of RATs include GSM, UTRA, E-UTRA (LTE), and NR.

NR: new radio. Refers to fifth generation (5G) technologies and the new radio access technology undergoing definition and standardization by the $3^{rd}$ Generation Partnership Project (3GPP).

DCI: downlink control information. A set of information transmitted at the physical (L1) Layer that, among other things, schedules the downlink data channel (e.g., the physical downlink shared channel (PDSCH)) or the uplink data channel (e.g., the physical uplink shared channel (PUSCH)).

Figure 1:
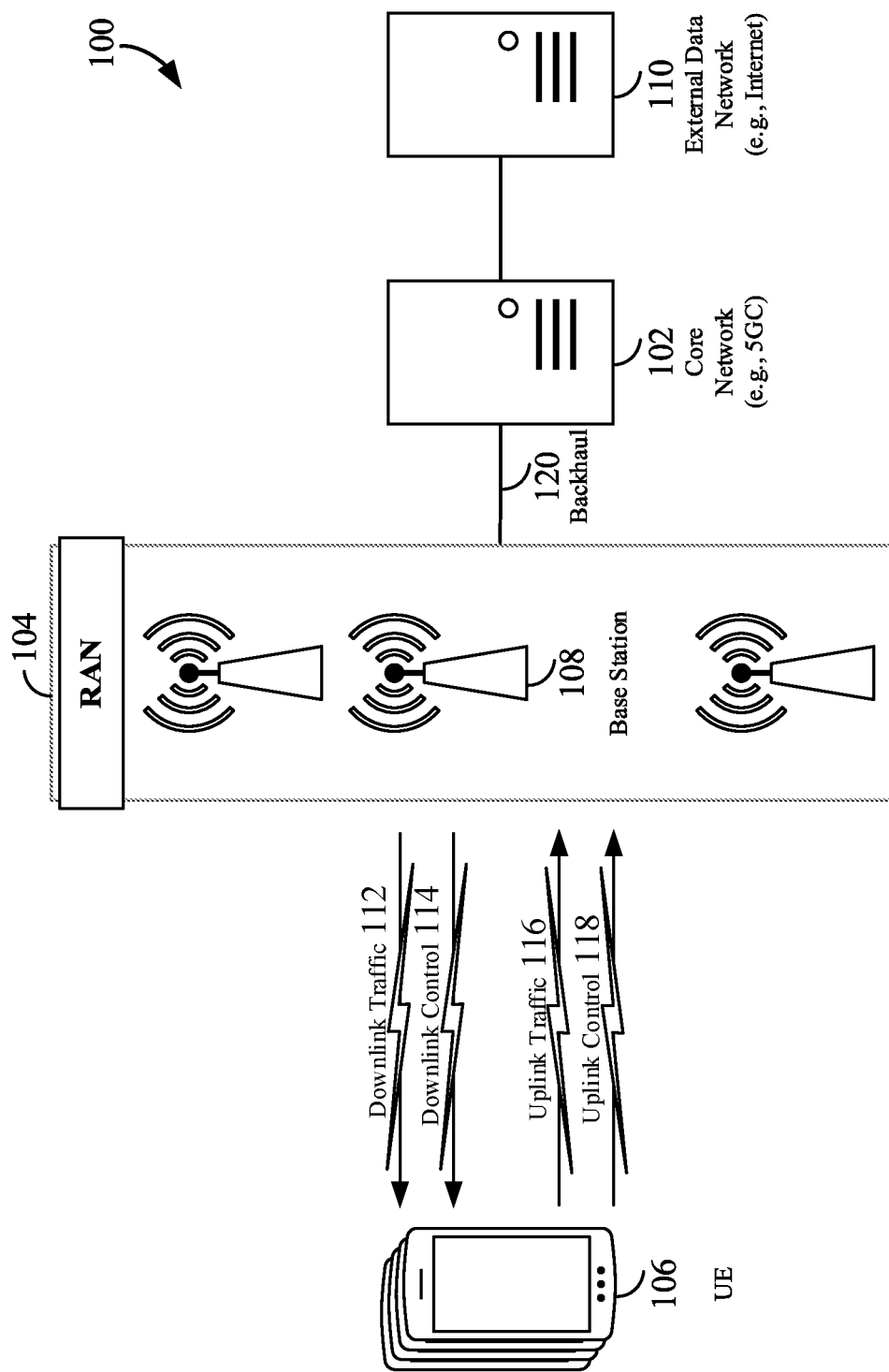
FIG. 1 is a schematic illustration of a wireless communication system with enhanced DSS in accordance with an aspect of the disclosure.

Referring now to FIG. 1, as an illustrative example without limitation, various aspects of the present disclosure are illustrated with reference to a wireless communication system 100 configured for enhanced DSS. The wireless communication system 100 includes three interacting domains: a core network 102, a radio access network (RAN) 104, and a plurality of NR user equipment (UE) 106. By virtue of the wireless communication system 100, each NR UE 106 may be enabled to carry out data communication with an external data network 110, such as (but not limited to) the Internet.

The RAN 104 utilizes enhanced dynamic spectrum sharing to provide service to each UE 106. As another example, the RAN 104 may operate with dynamic spectrum sharing between 5G NR and Evolved Universal Terrestrial Radio Access Network (eUTRAN), often referred to as LTE or 4G. More generally, the dynamic spectrum sharing occurs between a first radio access technology and a second radio access technology.

As illustrated, the RAN 104 includes a plurality of base stations 108. Each base station 108 is responsible for radio transmission and reception in one or more cells. In different technologies, standards, or contexts, a base station 108 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple UEs 106. A UE 106 may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a network device, or some other suitable terminology. Each UE 106 may be an apparatus that provides a user with access to network services.

Transmissions over the air interface from a base station 108 to one or more UEs 106 may be referred to as downlink (DL) transmissions. Transmissions from a UE 106 to a base station 108 may be referred to as uplink (UL) transmissions. As illustrated in FIG. 1, a base station 108 may broadcast downlink traffic 112 to one or more UEs 106. Each base station 108 is a node or device responsible for scheduling the downlink traffic 112 and, in some examples, uplink traffic 116 from the one or more UEs 106. On the other hand, each UE 106 is a node or device that receives downlink control information 114, including but not limited to scheduling information, synchronization or timing information, or other control information from a base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In a network configured for UL-based mobility, UL reference signals from each UE 106 may be utilized by the network 104 to select a serving cell for each UE 106. In some examples, the base stations 108 may broadcast unified synchronization signals (e.g., unified Primary Synchronization Signals (PSSs), unified Secondary Synchronization Signals (SSSs) and unified Physical Broadcast Channels (PBCH)). The UEs 106 may receive the unified synchronization signals, derive the carrier frequency and slot timing from the synchronization signals, and in response to deriving the timing, transmit an uplink pilot or reference signal. The uplink pilot signal transmitted by a UE 106 may be concurrently received by two or more cells each having its own base station 108 within the radio access network 104. Each cell may measure a strength of the pilot signal, and the radio access network 104 may then determine a serving cell for the UE 106. As each UE 106 travels through a cell, the radio access network 104 may continue to monitor the uplink pilot signal transmitted by the UE 106. When the signal strength or quality of the pilot signal measured by a neighboring cell exceeds that of the signal strength or quality measured by the serving cell, the radio access network 104 may handover the UE 106 from the serving cell to a neighboring cell, with or without informing the UE 106.

Figure 2:
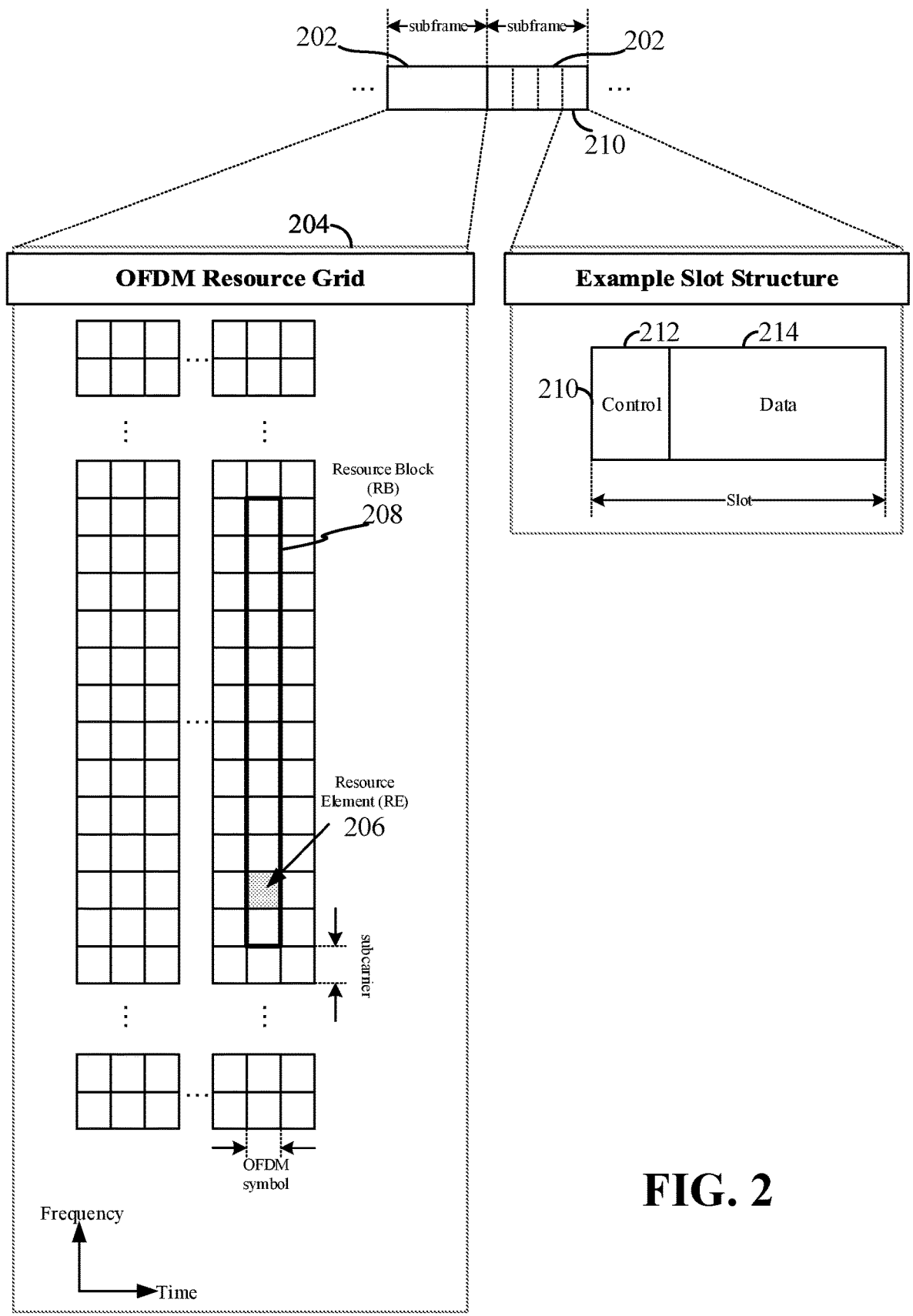
FIG. 2 is a schematic illustration of an organization of wireless resources utilizing orthogonal frequency divisional multiplexing (OFDM) for the wireless communication system of FIG. 1.

Various aspects of the present disclosure will be described with reference to an OFDM waveform, schematically illustrated in FIG. 2. Within the present disclosure, a frame refers to a duration of 10 ms for wireless transmissions, with each frame consisting of 10 subframes of 1 ms each. On a given carrier, there may be one set of frames in the UL, and another set of frames in the DL. An expanded view of an exemplary DL subframe 202 is also illustrated in FIG. 2, showing an OFDM resource grid 204. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 204 may be used to schematically represent time-frequency resources for a given antenna port. That is, in a MIMO implementation with multiple antenna ports available, a corresponding multiple number of resource grids 204 may be available for communication. The resource grid 204 is divided into multiple resource elements (REs) 206. An RE 206, which is 1 subcarrier×1 symbol, is the smallest discrete part of the time-frequency grid, and contains a single complex value representing data from a physical channel or signal. A block of twelve consecutive subcarriers defined a resource block (RB) 208, which has an undefined time duration in the NR standard. In FIG. 2, resource block 208 extends over a symbol duration. Within the present disclosure, it is assumed that a single RB such as the RB 208 entirely corresponds to a single direction of communication (either transmission or reception for a given device). A set of contiguous RBs 208 form a bandwidth part (BWP).

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of a slot 210 illustrates a control region 212 and a data region 214. In general, the control region 212 may carry control channels (e.g., the physical downlink control channel (PDCCH)), and the data region 214 may carry data channels (e.g., physical downlink shared channel (PDSCH) or physical uplink shared channel (PUSCH)). A slot 210 may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals, including but not limited to a demodulation reference signal (DMRS), or cell specific reference signal (CRS). These pilots or reference signals may provide for a receiving device to perform channel estimation of the corresponding channel, which may enable coherent demodulation/detection of the control and/or data channels within the RB 208.

Figure 3:
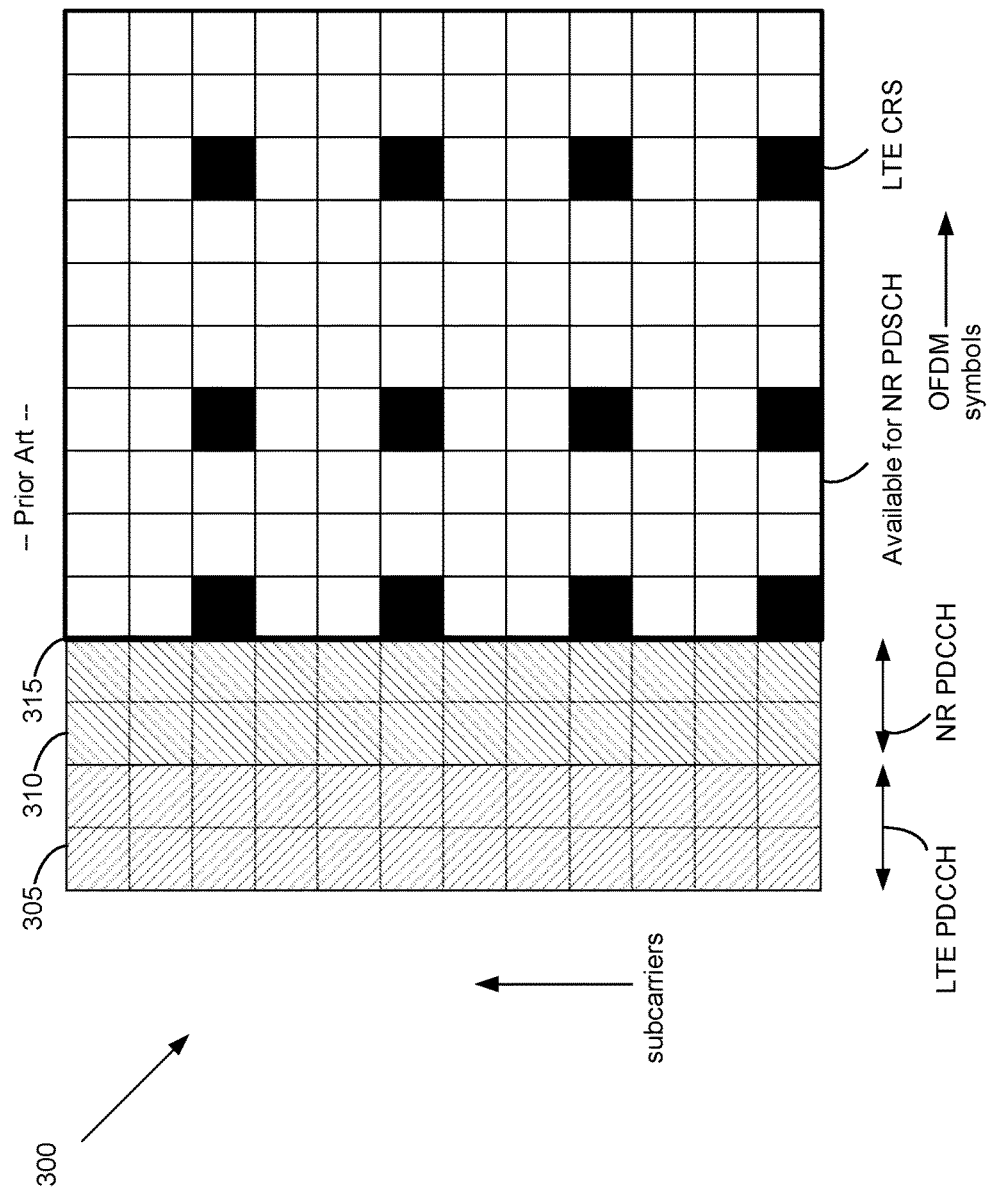
FIG. 3 is a diagram of the time and frequency resources for LTE and NR PDCCH and PDCSH using conventional dynamic spectrum sharing.

Some DSS background will now be discussed. The coexistence between LTE and NR depends upon the type of LTE sub-frame that is adapted to also support NR signaling. In LTE, some sub-frames may be multi-broadcast single-frequency network (MBSFN) sub-frames. In an MBSFN subframe, the final 12 OFDM symbols are reserved to be free from any LTE channel signaling. In this fashion, other services such a broadcast television may occupy the time and frequency resources that are not used by LTE in an MBSFN sub-frame. Although the DSS enhancements discussed herein may be broadly applied to include MBSFN sub-frames, note that MBSFN sub-frames are transmitted relatively infrequently and may thus subject an NR user to excessive latency. The following discussion will thus focus on rate-matching-based DSS in which a non-MBSFN subframe that contains LTE reference signals is also used to include NR signals. An example LTE (non-MBSFN) subframe 300 is shown in FIG. 3. For illustration clarity, just 12 subcarriers (sufficient for a resource block) are shown in subframe 300. Subframe 300 includes fourteen OFDM symbols and is thus equivalent to a single NR slot. This equivalence between an LTE subframe and an NR slot will depend in general on the subcarrier spacing, which is assumed to be 15 KHz in the following discussion without loss of generality.

The first two OFDM symbols in subframe 300 are dedicated to an LTE PDCCH 305. In general, the number of OFDM symbols necessary for LTE PDCCH 305 will depend upon the number of cell specific reference signal (CRS) ports and may range up to four OFDM symbols in other implementations. The third and fourth OFDM symbols in subframe 300 are dedicated to NR PDCCH 310 and associated demodulation reference signals (DMRSs). A frequency-time resource element data region 315 spanning from the fifth OFDM symbol to the fourteenth OFDM symbol is shared by both LTE PDSCH and NR PDSCH. However, various resource elements in data region 315 are occupied by LTE CRS ports. The number of resource elements dedicated to LTE CRS ports increases as the number of CRS ports is increased. NR PDSCH cannot occupy any resource elements in the first four symbols in subframe 300 due to LTE PDCCH 305 and NR PDCCH 310. But even in data region 315, some resource elements are dedicated to LTE CRS ports. Other resource elements in region 315 may be occupied by LTE PDSCH. The number of resource elements available to NR PDSCH in data region 315 is thus limited and may be insufficient as the number of NR users in a cell increases.

To increase the number of available resource elements to NR PDSCH despite the use of DSS, a modified LTE control region is disclosed that also supports LTE PDCCH. A separate LTE PDCCH region such as region 310 may then instead be available to NR PDSCH. Some exemplary implementations for these DSS improvements will now be discussed in more detail.

Exemplary Implementations for DSS PDCCH Enhancements

Figure 4:
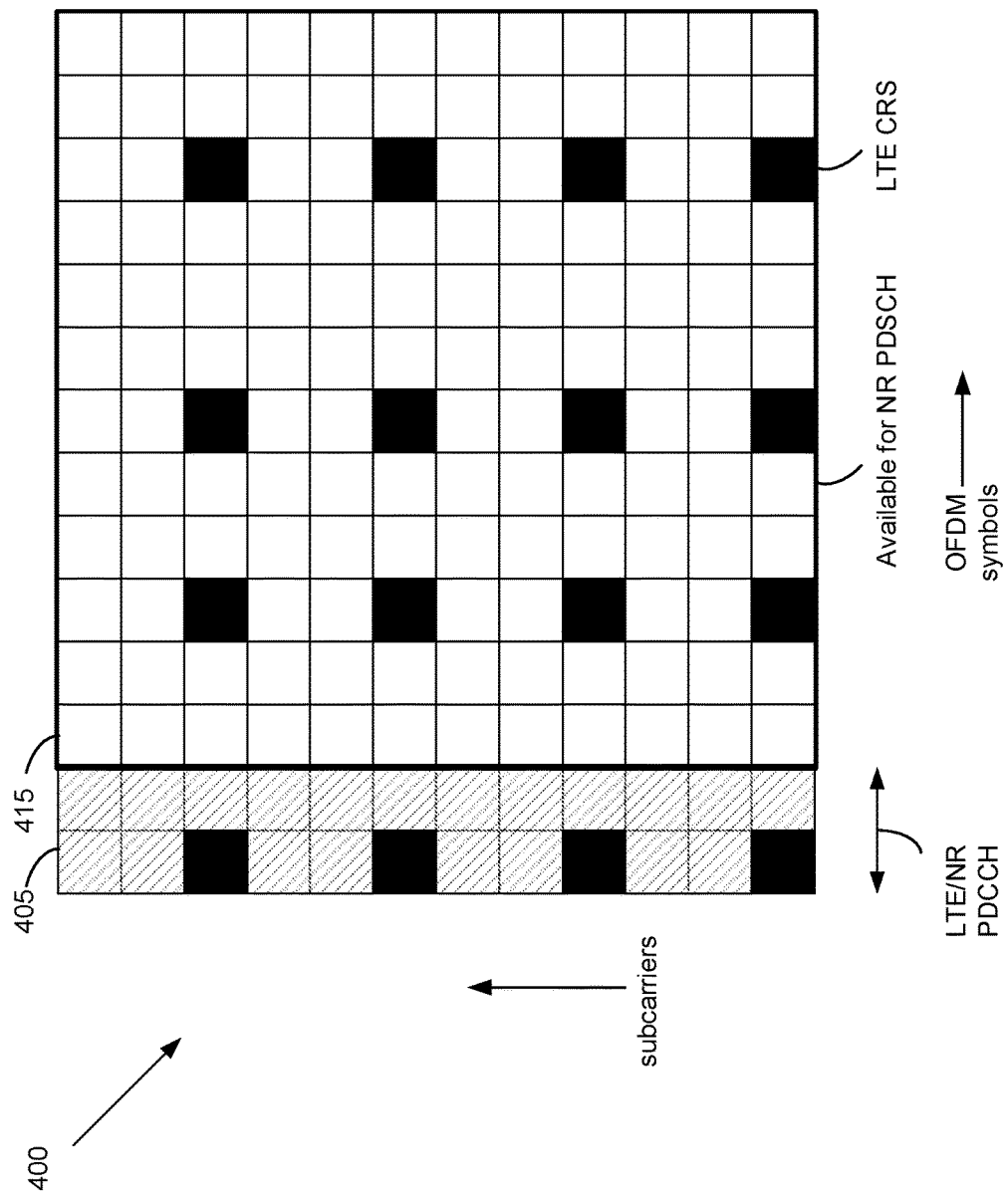
FIG. 4 is a diagram of the time and frequency resources for LTE and NR PDCCH and PDCSH using enhanced dynamic spectrum sharing in accordance with an aspect of the disclosure.

An improved DSS subframe 400 is shown in FIG. 4 that includes a shared or multiplexed control region 405 that supports both LTE PDCCH and NR PDCCH. Subframe 400 includes fourteen OFDM symbols and is thus equivalent to a single NR slot. This equivalence between an LTE subframe and an NR slot will depend in general on the subcarrier spacing, which again assumed to be 15 KHz in the following discussion without loss of generality. Control region 405 extends across just the first two OFDM symbols. More generally, the width or OFDM-symbol expanse of control region 405 depends upon the number of CRS ports used by the LTE network. Two CRS ports are supported by DSS subframe 400, but it will be appreciated that as many as four CRS ports may be supported in alternative implementations. For illustration clarity, subframe 400 is shown as including just 12 subcarriers (sufficient for a resource block). The third and fourth OFDM symbols are now included in an expanded time-frequency resource data region 415 that spans from the third OFDM symbol to the fourteenth OFDM symbol. Since no resource elements in the third and fourth OFDM symbols are dedicated to LTE CRS, the number of resource elements that may be occupied by NR PDSCH in data region 415 is advantageously expanded as compared to data region 315.

Consider again LTE PDCCH region 305 and NR PDCCH region 310 in subframe 300. To construct each region, a base station may start with the downlink control information (DCI). The DCI for NR PDCCH region 310 is distinct from the DCI for LTE PDCCH region 305. The base station may then perform a coding of the DCI but again this coding is distinct in LTE as compared to NR. In particular, LTE PDCCH region 305 is encoded using a tail biting convolutional code whereas the base station polar encodes NR PDCCH region 310. After the DCIs are encoded, both encoded DCIs regions are scrambled but this scrambling varies between NR and LTE. The scrambled encoded DCI is then mapped to a modulation symbol using, for example, quadrature phase shift keying (QPSK). Pilots are then inserted into the control data stream from the modulation. In LTE, the pilots are CRS pilots whereas the pilot signals are DMRS pilots in NR. The modulated and pilot-inserted control data stream is then layer mapped and finally mapped to resource elements. Both the layer mapping and resource element mapping differ between NR and LTE. Given these fundamental differences between the LTE and NR PDCCH control regions, it is problematic to integrate them.

The multiplexing of NR PDCCH with LTE PDCCH in control region 405 may be advantageously performed in a number of fashions as disclosed herein despite these LTE and NR differences. What is common to all these implementations is that the resource element mapping is an LTE resource element mapping and the CRS pilots are inserted. This is fundamental since an LTE UE must be able to receive its PDCCH and estimate the channel(s) using the received CRS pilots. If the NR control information were mapped to resource elements in the LTE/NR common control region using an NR resource element mapping, the NR control information may then be mapped to a resource element that was also used by the LTE resource element mapping. It may thus be appreciated that a common resource element mapping (either NR or LTE) must be used. Since an LTE UE is not configured for an NR resource mapping, the resource element mapping for the common control region is an LTE mapping in the following example implementations. Similarly, an LTE UE requires the presence of the CRS pilots in the common control region. The number of these CRS pilots depends upon the number of CRS ports being implemented.

Figure 5:
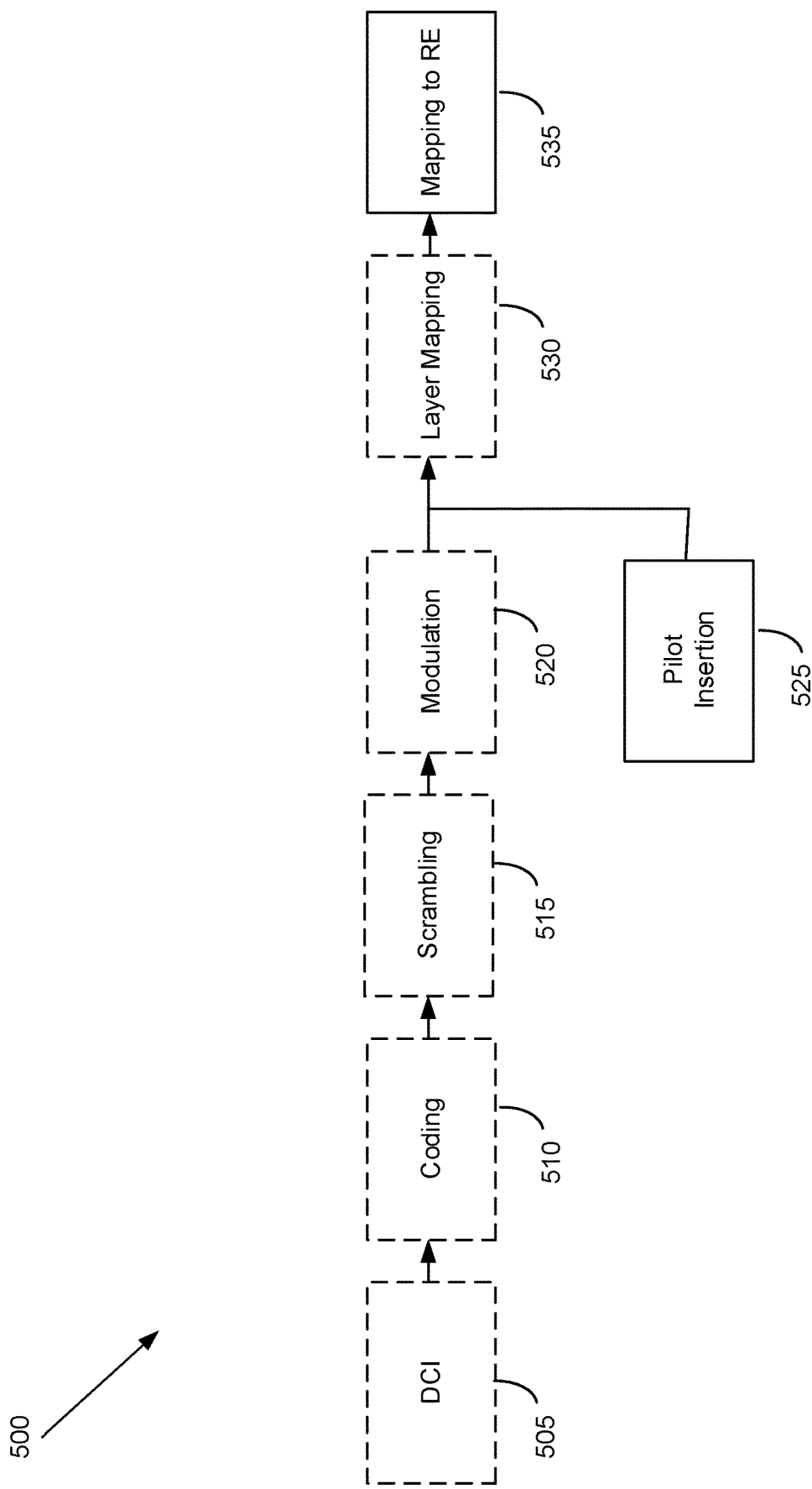
FIG. 5 is a process flow for a base station generating the shared control region of FIG. 4 using NR processing steps except for the insertion of the CRS pilots and LTE resource element mapping in accordance with an aspect of the disclosure.

As used herein, a PDCCH processing step is deemed to be an NR or LTE processing step as those PDCCH processing steps are defined in the 3GPP technical specification (TS) 38.211 for NR or 36.211 for LTE, respectively. In a first implementation of the enhanced DSS, the NR DCI is processed by the DSS base station according to NR processing steps except that the CRS pilots are inserted and the NR DCI is mapped to resource elements according to a LTE resource element mapping. An NR UE receiving this NR DCI information may then use the CRS pilots to perform channel estimation with a translation of the CRS ports to a DMRS port. An example NR PDCCH enhanced DSS processing 500 at a base station to produce the NR PDCCH in the shared control region is shown in FIG. 5. The base station NR codes (polar coding) an NR-formatted DCI 505 using an NR coding step 510 before the encoded NR DCI is scrambled according to an NR scrambling protocol 515. The scrambled and encoded NR DCI is then modulated onto QPSK symbols in an NR modulation step 520. Depending upon the number of CRS ports (1, 2, or 4), the corresponding cell-specific reference pilots are inserted in a UE pilot insertion step 525, and the resulting modulated NR DCI and CRS pilots are mapped according to a single-layer mapping 530. Such a single layer mapping is consistent with the single-layer mapping used for conventional (non-DSS) NR. However, note that the combined control region for a DSS network should be consistent with the LTE CRS port mapping, which may be multi-layer depending upon the number of CRS ports. Each CRS port is mapped to a corresponding antenna port. If there are two CRS ports, the LTE PDCCH is thus mapped to the two corresponding antenna ports. An issue for PDCCH processing 500 thus becomes one of how to map the single layer NR PDCCH to multiple antenna ports should multiple CRS ports be used for the LTE PDCCH.

In one implementation disclosed herein, the NR PDDCH is mapped to a single antenna port (e.g., the NR PDCCH port and the CRS port 0 may be the same) in layer mapping 530. Although such a single layer mapping is then compatible with the CRS ports, note that broadcasting the NR PDDCH using just one of the CRS antenna ports (or ports) results in a power loss as compared to the LTE PDDCH, which is broadcast through all the CRS antenna ports rather than just one. To prevent this power loss, the single layer NR PDDCH may be mapped to the CRS antenna ports by a precoding combination in an alternative implementation of layer mapping 530. For example, for a DSS implementation using two CRS antenna ports [p1, p2], the PDDCH port may be mapped by a precoding combination of [p1+jp2], where j is +1 or −1. Referring again to the mapping of the NR PDDCH to just one CRS antenna port, it may be seen that such an implementation may be deemed to be a two-port mapping with the precoding of [p1+0*p2].

In one implementation disclosed herein, the NR PDCCH is mapped to a single antenna port (e.g., the NR PDCCH port and the CRS port 0 may be the same) in layer mapping 530. Although such a single layer mapping is then compatible with the CRS ports, note that broadcasting the NR PDCCH using just one of the CRS antenna ports (or ports) results in a power loss as compared to the LTE PDCCH, which is broadcast through all the CRS antenna ports rather than just one. To prevent this power loss, the single layer NR PDCCH may be mapped to the CRS antenna ports by a precoding combination in an alternative implementation of layer mapping 530. For example, for a DSS implementation using two CRS antenna ports [p1, p2], the PDCCH port may be mapped by a precoding combination of [p1+jp2], where j is +1 or −1. Referring again to the mapping of the NR PDCCH to just one CRS antenna port, it may be seen that such an implementation may be deemed to be a two-port mapping with the precoding of [p1+0*p2].

Although a precoding using all the available CRS antenna ports avoids the power loss of mapping the NR PDCCH to just one CRS antenna port, note that there may be destructive interference as the NR PDCCH propagates over the resulting channels to the NR UE. For example, the NR PDCCH transmission through the channel corresponding to a first CRS port may be the exactly out of phase with the transmission through a channel corresponding to a second CRS port. To address this potential destructive interference, precoding cycling may be used. For example, a precoding cycling (a change in the precoding) may be performed for each resource element. Alternatively, the precoding cycling may be responsive to a resource element grouping or to a physical resource block grouping. Regardless of how the precoder cycling is performed, the precoding may be predetermined or may depend upon a variety of parameters such as system bandwidth, number of PDCCH symbols, cell ID, control resource set (CORESET) ID, and so on. With layer mapping 530 being completed, the layer-mapped NR control data and CRS pilots are mapped to resource elements according to an LTE resource element mapping 535 to complete processing 500. To highlight that only pilot insertion 525 and resource element mapping 535 are consistent with the processing of LTE PDCCH, these elements are shown with a solid black line in FIG. 5. The remaining elements are dotted as they are not consistent with the processing of LTE PDCCH.

Although PDCCH processing 500 was described with respect to the base station, it will be appreciated that an NR UE may receive its NR PDCCH using the reverse order of processing steps shown in FIG. 5. Such an NR UE may thus extract an extracted signal from the resource elements according to LTE resource element mapping 535. If the NR PDCCH had been mapped to just one CRS antenna port, the corresponding CRS port is used to estimate the downlink channel as translated to a DMRS port. If, however, the NR PDCCH had been mapped to multiple CRS antenna ports, the downlink channel estimation uses the multiple CRS ports according to their precoding. With the downlink channel estimated, the NR UE may then proceed to demodulate NR modulation 520, de-scramble NR scrambling 515, and decode NR coding 510 to recover the NR-formatted DCI 505.

Figure 6:
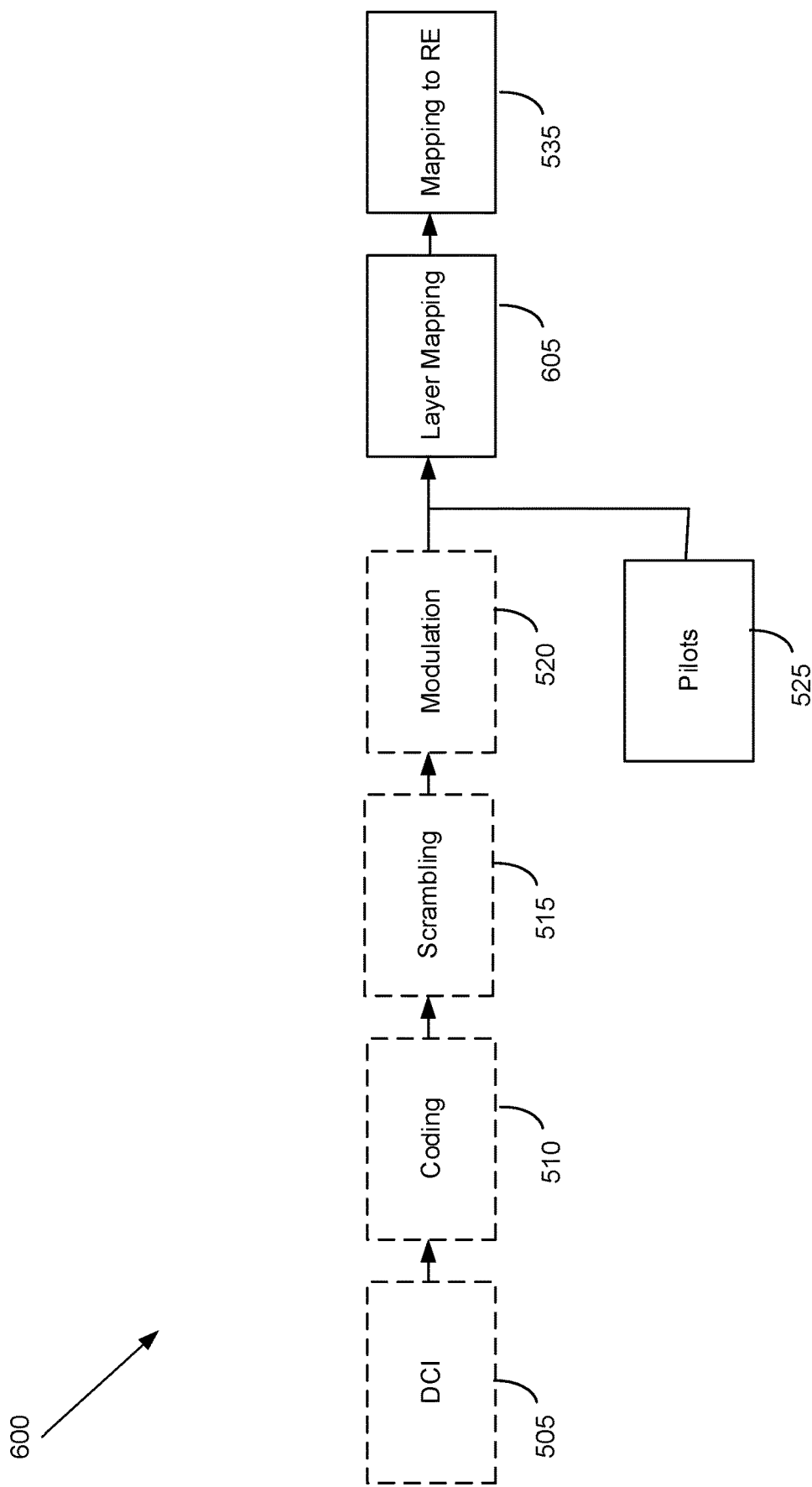
FIG. 6 is a process flow for a base station generating the shared control region of FIG. 4 using NR processing steps except for the insertion of the CRS pilots, the LTE layer mapping, and the LTE resource element mapping in accordance with an aspect of the disclosure.

The modulated NR DCI and the inserted CRS pilots may instead be LTE layer mapped as shown for an NR PDCCH processing 600 of FIG. 6. Processing 600 is similar to processing 500 except that in addition to the LTE CRS pilot insertion 525 and LTE resource element mapping 535, an LTE layer mapping 605 is used for the layer mapping of the modulated NR DCI. PDCCH processing 600 includes the NR coding 510 of NR-formatted DCI 505, the NR scrambling 515 of the encoded NR DCI, and the NR modulation 520 of the scrambled and encoded NR DCI as discussed with regard to PDCCH processing 500. An NR UE that receiving NR PDCCH processed as discussed for NR PDCCH 600 will thus use the CRS ports to estimate the downlink channels (assuming multiple CRS ports are used) or downlink channel (should just one CRS port be used). This channel estimation would then be translated to a DMRS port as discussed for processing 500. With the downlink channel estimated, the NR UE may then proceed to demodulate NR modulation 520, de-scramble NR scrambling 515, and decode NR coding 510 to recover the NR-formatted DCI 505.

Figure 7:
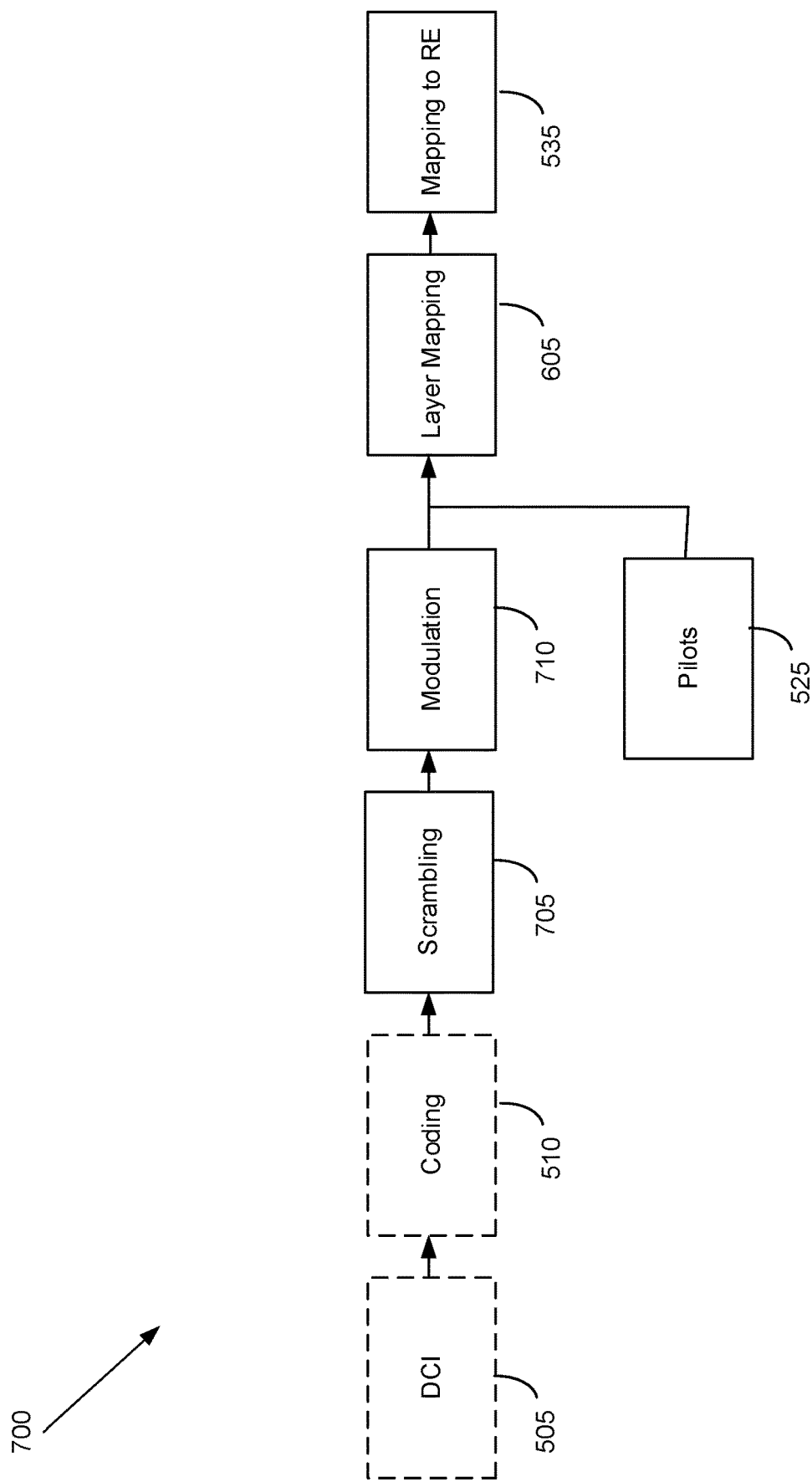
FIG. 7 is a process flow for a base station generating the shared control region of FIG. 4 using LTE processing steps except for the formatting and coding of the NR DCI in accordance with an aspect of the disclosure.

In another implementation in which the channel estimation uses CRS ports, the NR-formatted DCI 505 may be NR coded 510 as shown for an NR PDCCH processing 700 in FIG. 7. The encoded NR DCI information is then LTE scrambled 705 and LTE modulated 710. It should be noted that since the modulation of LTE PDCCH and NR PDCCH are both quadrature phase-shift keying (QPSK), it is arbitrary to denote herein a modulation of scrambled downlink control information as being either NR or LTE since the same modulation is used in both instances. CRS pilots 525 are then inserted and the modulated NR DCI LTE layer mapped 605 and LTE resource element mapped 535 to complete NR PDCCH processing 700. An NR UE may then proceed to recover NR-formatted DCI 505 from the broadcasting of an NR PDCCH produced as discussed for PDCCH processing 700 in the same fashion as discussed for PDCCH processing 600 except that the de-scrambling is a de-scrambling of LTE scrambling 705 instead of an NR scrambling.

Figure 8:
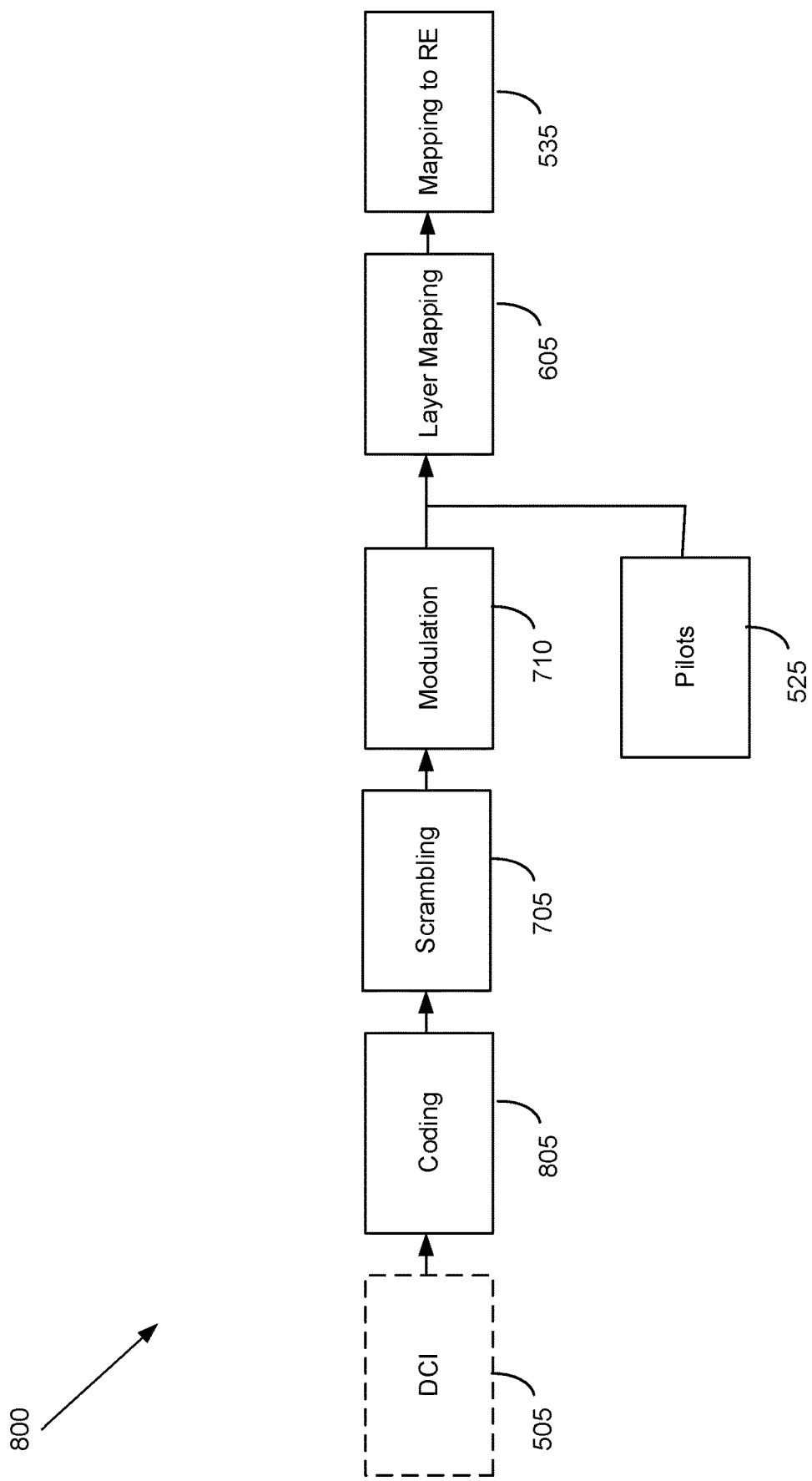
FIG. 8 is a process flow for a base station generating the shared control region of FIG. 4 using LTE processing steps except for the formatting of the NR DCI in accordance with an aspect of the disclosure.

In yet another implementation in which the CRS pilots are used to estimate the downlink channel(s), the DSS base station may produce the NR PDCCH as shown in FIG. 8 for an NR PDCCH processing 800. The NR-formatted DCI 505 is coded using LTE coding 805. As compared to the polar coding used for NR coding 510, LTE coding 805 uses a tail-biting convolution coding. The remaining steps of LTE scrambling 705, LTE modulation 710, CRS pilot insertion 525, LTE layer mapping 605, and LTE resource element mapping 535 are as discussed with regard to PDCCH processing 700. An NR UE may then proceed to recover NR-formatted DCI 505 from the broadcasting of an NR PDCCH processed as discussed for PDCCH processing 800 in the same fashion as discussed for PDCCH processing 700 except that the decoding is a decoding of LTE coding 805 instead of an NR coding.

Figure 9:
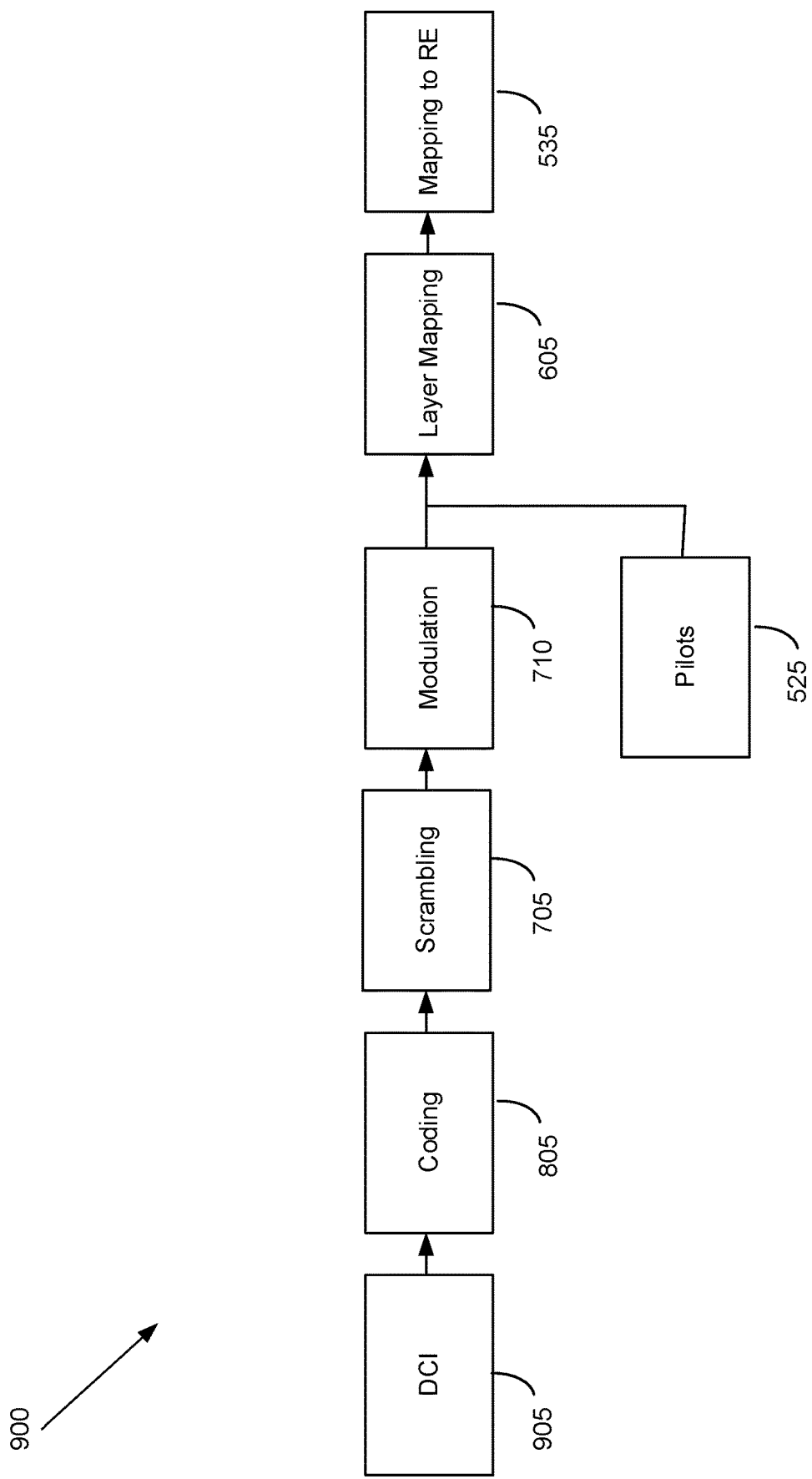
FIG. 9 is a process flow for a base station generating the shared control region of FIG. 4 using LTE processing steps in accordance with an aspect of the disclosure.

NR PDCCH processing 800 may be modified as shown in FIG. 9 for an NR PDCCH processing 900. LTE coding 805 and the remaining steps of LTE scrambling 705, LTE modulation 710, CRS pilot insertion 525, LTE layer mapping 605, and LTE resource element mapping 535 are as discussed for PDCCH processing 800. But PDCCH processing 900 begins with LTE-formatted DCI 905 as compared to NR-formatted DCI 505. An NR UE that processes an NR PDCCH produced as discussed for PDCCH processing 900 will thus monitor for an LTE DCI format (e.g. format 0). In contrast, an NR UE receiving an NR PDCCH that was processed as discussed for NR PDCCH processing 500, 600, 700, or 800 will instead monitor for an NR DCI format such as 0_0, 0_1, 0_2, and so on.

Figure 10:
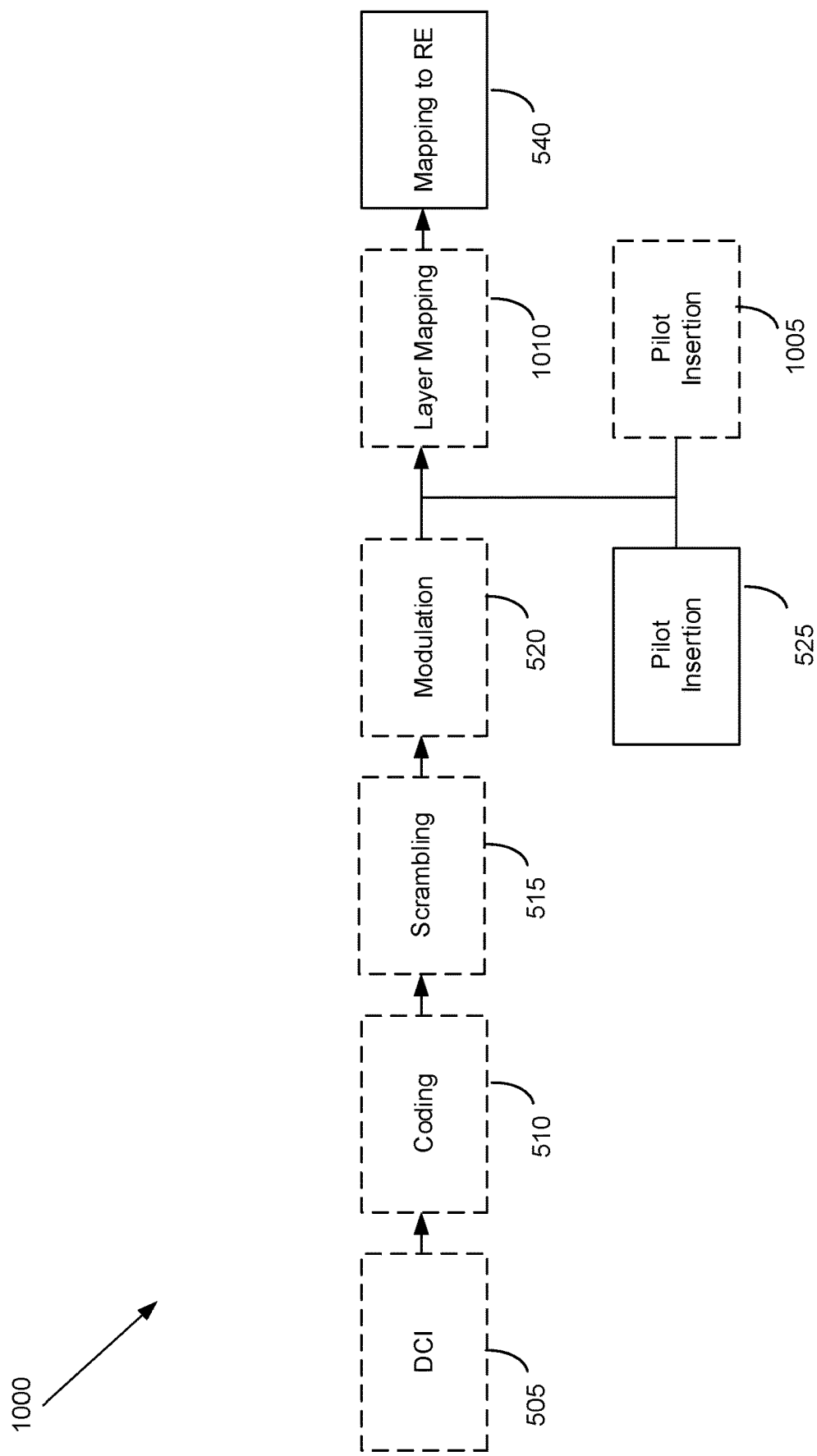
FIG. 10 is a process flow for a base station generating the shared control region of FIG. 4 using NR processing steps except for the insertion of the CRS pilots and LTE resource element mapping in accordance with an aspect of the disclosure.

In NR PDCCH processing 500, 600, 700, 800, and 900, the NR UE estimates the downlink channel(s) over which the NR PDCCH was broadcast using the CRS ports and translated to an DMRS port. To allow the NR UE to directly estimate the channel using DMRS, the DSS base station may instead process the NR PDCCH as shown in FIG. 10 for an NR PDCCH processing 1000. NR PDCCH processing 1000 is similar to NR PDCCH processing 500 in that the only LTE PDCCH steps are the pilot insertion 525 of the CRS pilots and the LTE resource element mapping 540. NR PDCCH processing 1000 thus includes the NR coding 510 of NR-formatted DCI 505, the NR scrambling 515 of the encoded NR DCI, and the NR modulation 520 of the scrambled and encoded NR DCI. In addition to the CRS pilot insertion 525 to the modulated NR DCI, DMRS pilots 1005 are also inserted. The modulated and encoded DCI and DMRS pilots may then be NR single-layer mapped 1010 and finally LTE resource element mapped 540 to resource elements before the resulting LTE control information is broadcast from the DSS base station to an NR UE. But note that the DMRS pilot insertion 1005 cannot interfere with the resource elements that will be dedicated to the cell-specific reference signals. To prevent the DMRS insertion from interfering with the CRS plot insertion, DMRS pilot insertion may occur in several fashions. In a first implementation, the NR legacy resource element group (REG) structure may be retained in mapping 1010 so that the DMRS is mapped on a REG basis. For example, every fourth resource element in a quadruplet of REs may be used for DMRS such that the remaining REs in the quadruplet are dedicated to the NR DCI. An NR UE may then demodulate the remaining REs based upon the included DMRS. Alternatively, a set of resource element groups may be reserved for DMRS transmission. In such an implementation, no NR DCI is included in the REGs dedicated to DMRS transmission. An NR UE may then demodulate NR PDCCH resource element groups based upon the closest DMRS resource element group. It will be further appreciated that an NR UE may perform channel estimation not only using DMRS directly but may also use CRS ports as discussed for NR PDCCH processing 500, 600, 700, 800, and 900.

Figure 11:
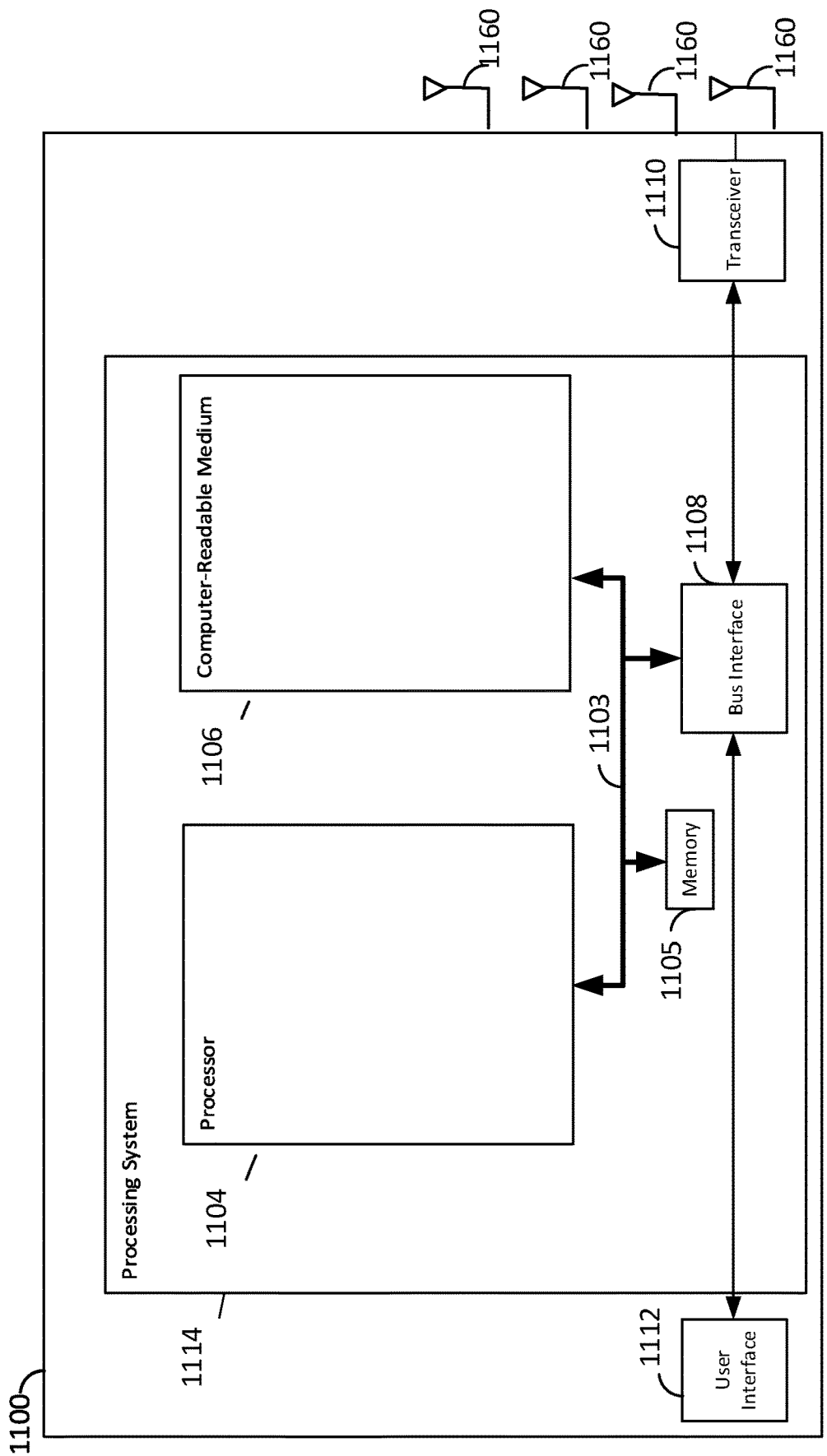
FIG. 11 is a diagram of a network node (e.g., a base station or an NR user equipment) in a network with enhanced dynamic spectrum sharing in accordance with an aspect of the disclosure.

Some example implementations of a base station and a user equipment in an enhanced DSS network will now be discussed. A network node 1100 is shown in FIG. 11 that is generic to a UE or a base station for the implementation of the enhanced DSS disclosed herein. Network node 1100 includes a processing system 1114 having a bus interface 1108, a bus 1102, memory 1105, a processor 1104, and a computer-readable medium 1106. Furthermore, node 1100 may include a user interface 1112 and a transceiver 1110. Transceiver 1110 transmits and receives through an array of antennas 1160.

Processor 1104 is also responsible for managing the bus 1102 and general processing, including the execution of software stored on the computer-readable medium 1106. The software, when executed by the processor 1104, causes the processing system 1114 to perform the enhanced DSS disclosed herein. For example, should network node 1100 represent a UE, processor 1104 recovers DCI according to the reverse order of one of NR PDCCH processing 500, 600, 700, 700, 900, and 1000. Similarly, should network node 1100 represent a base station, processor 1104 manages the DCI processing according to one of NR PDCCH processing 500, 600, 700, 700, 900, and 1000. The computer-readable medium 1106 and the memory 1105 may also be used for storing data that is manipulated by the processor 1104 when executing software.

The bus 1102 may include any number of interconnecting buses and bridges depending on the specific application of the processing system 1114 and the overall design constraints. The bus 1102 communicatively couples together various circuits including one or more processors (represented generally by the processor 1104), the memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. The bus interface 1108 provides an interface between the bus 1102 and the transceiver 1110.

Figure 12:
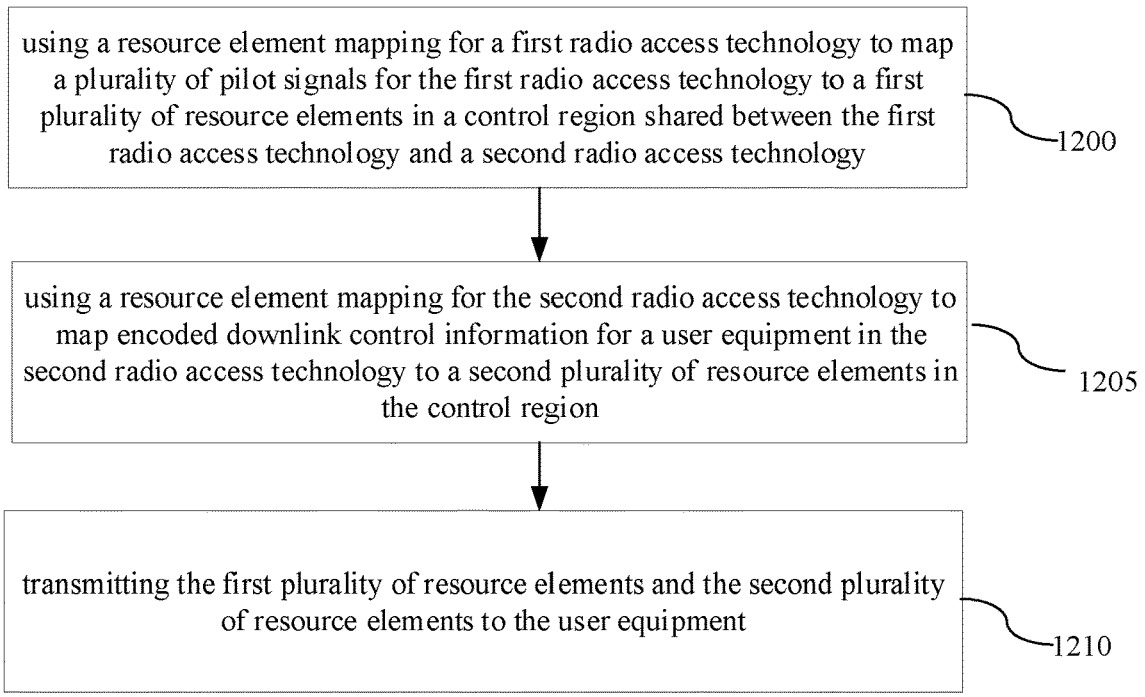
FIG. 12 is a flowchart for a base station processing method to produce a shared downlink physical control channel region in accordance with an aspect of the disclosure.

A method of operation for a base station for the processing of the shared control region for a first radio access technology (e.g., LTE) and a second radio access technology (e.g., NR) will now be discussed with regard to the flowchart of FIG. 12. The method includes an act 1200 of using a resource element mapping for a first radio access technology to map a plurality of pilot signals for the first radio access technology to a first plurality of resource elements in a control region shared between the first radio access technology and a second radio access technology. The use of LTE resource element mapping 535 to map the CRS pilots to the corresponding resource elements such as shown in control region 405 is an example of act 1200. The method further includes an act 1205 of using a resource element mapping for the second radio access technology to map encoded downlink control information for a user equipment in the second radio access technology to a second plurality of resource elements in the control region. The use of LTE resource element mapping 525 to map encoded NR downlink control information to available resource elements (those resource elements not occupied by LTE CRS or LTE DCI) in control region 405 is an example of act 1205. Finally, the method includes an act 121 of transmitting the first plurality of resource elements and the second plurality of resource elements to the user equipment. The transmission by transceiver 1110 of these resource elements is an example of act 1210.

Some aspects of the preceding discussion will now be summarized in the following clauses.

Clause 1. A method of wireless communication for a base station, comprising:
using a resource element mapping for a first radio access technology to map a plurality of pilot signals for the first radio access technology to a first plurality of resource elements in a control region shared between the first radio access technology and a second radio access technology;
using the resource element mapping for the first radio access technology to map encoded downlink control information for a user equipment associated with the second radio access technology to a second plurality of resource elements in the control region; and
transmitting the first plurality of resource elements and the second plurality of resource elements to the user equipment.

Clause 2. The method of clause 1, further comprising:
formatting downlink control information according to a downlink control information format for the first radio access technology to form formatted downlink control information; and
coding the formatted downlink control information for the user equipment according to a physical downlink control channel (PDCCH) coding for the first radio access technology to form the encoded downlink control information.

Clause 3. The method of any of clauses 1-2, further comprising:
scrambling the encoded downlink control information according to a PDCCH scrambling for the first radio access technology.

Clause 4. The method of any of clauses 1-3, further comprising:
modulating the encoded downlink control information according to a PDCCH modulation for the first radio access technology.

Clause 5. The method of clause 1, further comprising:
formatting downlink control information according to a downlink control information format for the second radio access technology to form formatted downlink control information; and
coding the formatted downlink control information for the user equipment according to a physical downlink control channel (PDCCH) coding for the first radio access technology to form the encoded downlink control information.

Clause 6. The method of clause 5, wherein the coding for the first radio access technology is a tail biting convolutional coding.

Clause 7. The method of clause 1, further comprising:
formatting downlink control information according to a downlink control information format for the second radio access technology to form formatted downlink control information; and
coding the formatted downlink control information for the user equipment according to a physical downlink control channel (PDCCH) coding for the second radio access technology to form the encoded downlink control information.

Clause 8. The method of clause 7, wherein the coding for the second radio access technology is a polar coding.

Clause 9. The method of any of clauses 7-8, further comprising:
scrambling the encoded downlink control information according to a PDCCH scrambling for the first radio access technology.

Clause 10. The method of any of clauses 7-8, further comprising:
scrambling the encoded downlink control information according to a PDCCH scrambling for the second radio access technology.

Clause 11. The method of any of clauses 7-8 and 10, further comprising modulating the encoded downlink control information according to PDCCH modulation for the second radio access technology.

Clause 12. The method of clause 10, wherein mapping the plurality of pilot signals further comprises mapping the plurality of pilot signals to a first transmission layer and to a second transmission layer, and wherein mapping the encoded downlink control information further comprises mapping the encoded downlink control information to only the first transmission layer.

Clause 13. The method of clause 10, wherein transmitting the first plurality of resource elements comprises transmitting the first plurality of resource elements through at least a first antenna port and a second antenna port, and wherein transmitting the second plurality of resource elements comprises transmitting the second plurality of resource elements through only the first antenna port.

Clause 14. The method of clause 10, wherein transmitting the first plurality of resource elements comprises transmitting the first plurality of resource elements through at least a first antenna port and a second antenna port, and wherein transmitting the second plurality of resource elements comprises transmitting the second plurality of resource elements through at least the first antenna port and the second antenna port according to a precoding combination.

Clause 15. The method of clause 14, further comprising: cycling the precoding combination for each resource element group in the second plurality of resource elements.

Clause 16. The method of clause 14, further comprising cycling the precoding combination for each physical resource block in the second plurality of resource elements.

Clause 17. The method of clause 14, further comprising: cycling the precoding combination responsive to at least one of a system bandwidth, a symbol size of the encoded downlink control information, a cell identification, and a control resource identification.

Clause 18. The method of clause 10, further comprising: mapping a plurality of pilot signals for the second radio access technology to the second plurality of resource elements in the shared control region according to the resource element mapping for the first radio access technology.

Clause 19. The method of clause 18, wherein the plurality of pilot signals for the second radio access technology comprises a plurality of demodulation reference signals.

Clause 20. The method of clause 19, wherein mapping the plurality of demodulation reference signals comprises mapping a demodulation reference signal to every fourth subcarrier in each resource element group in the second plurality of resource elements.

Clause 21. The method of clause 19, wherein mapping the plurality of demodulation reference signals comprises mapping the plurality of demodulation references signals to dedicated resource element groups in the second plurality of resource elements.

Clause 22. A base station, comprising:
a processor configured to control:
a mapping of a plurality of pilot signals according to a resource element mapping of a first radio access technology to a first plurality of resource elements in a control region shared between the first radio access technology and a second radio access technology;
a mapping of encoded downlink control information for a user equipment in a second radio access technology to a second plurality of resource elements in the shared control region according to the first radio access technology resource element mapping; and
a transceiver configured to transmit the first plurality of resource elements and the second plurality of resource elements to the user equipment.

Clause 23. The base station of clause 22, where the processor is further configured to control:
a formatting of downlink control information according to a downlink control information format for the second radio access technology to form formatted downlink control information; and
a coding of the formatted downlink control information for the user equipment according to a physical downlink control channel (PDCCH) coding for the second radio access technology to form the encoded downlink control information.

Clause 24. The base station of any of clauses 22-23, wherein the processor is further configured to control a scrambling of the encoded downlink control information according to a PDCCH scrambling for the second radio access technology.

Clause 25. The base station of any of clauses 23-24, wherein the first radio access technology is long term evolution (LTE) and the second radio access technology is new radio (NR).

Clause 26. A method of wireless communication for a user equipment, comprising:
extracting resource elements in a received signal according to a resource element mapping of a first radio access technology to provide an extracted signal; and
recovering downlink control information for the user equipment from the extracted signal, wherein the downlink control information schedules a physical downlink channel in a second radio access technology for the user equipment.

Clause 27. The method of clause 26, wherein recovering the downlink control information includes descrambling the downlink control information according a scrambling for the first radio access technology.

Clause 28. The method of clause 26, wherein recovering the downlink control information includes descrambling the downlink control information according a scrambling for the second radio access technology.

Clause 29. The method of any of clauses 26 and 27, wherein recovering the downlink control information includes decoding the downlink control information according a coding for the first radio access technology.

Clause 30. The method of any of clauses 26 and 28, wherein recovering the downlink control information includes decoding the downlink control information according a coding for the second radio access technology.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but instead are to be accorded the full scope consistent with the language of the claims.

What is claimed is:
1. A method of wireless communication for a base station, comprising:

using a long term evolution (LTE) resource element mapping to map a plurality of LTE pilot signals to a first plurality of resource elements in a shared control region that is shared between LTE and new radio (NR), wherein mapping the plurality of LTE pilot signals further comprises mapping the plurality of LTE pilot signals to a first transmission layer and to a second transmission layer;

formatting downlink control information for an NR user equipment according to an NR downlink control information format to form formatted downlink control information;

coding the formatted downlink control information according to an NR physical downlink control channel (PDCCH) to form encoded downlink control information;

scrambling the encoded downlink control information according to an NR PDCCH scrambling to form scrambled downlink control information;

modulating the scrambled downlink control information according to an NR PDCCH modulation to form modulated downlink control information;

using the LTE resource element mapping to map the modulated downlink control information to a second plurality of resource elements in the shared control region, wherein mapping the modulated downlink control information further comprises mapping the encoded downlink control information to only the first transmission layer; and transmitting the first plurality of resource elements and the second plurality of resource elements to the NR user equipment.

2. The method of claim 1, wherein transmitting the first plurality of resource elements comprises transmitting the first plurality of resource elements through at least a first antenna port and a second antenna port, and wherein transmitting the second plurality of resource elements comprises transmitting the second plurality of resource elements through only the first antenna port.

3. The method of claim 1, further comprising:
mapping a plurality of NR pilot signals to the second plurality of resource elements in the shared control region according to the LTE resource element mapping.

4. The method of claim 3, wherein the plurality of NR pilot signals comprises a plurality of demodulation reference signals.

5. The method of claim 4, wherein mapping the plurality of demodulation reference signals comprises mapping a demodulation reference signal to every fourth subcarrier in each resource element group in the second plurality of resource elements.

6. The method of claim 4, wherein mapping the plurality of demodulation reference signals comprises mapping the plurality of demodulation reference signals to dedicated resource element groups in the second plurality of resource elements.

7. A method of wireless communication for a base station, comprising:
using a long term evolution (LTE) resource element mapping to map a plurality of LTE pilot signals to a first plurality of resource elements in a shared control region that is shared between LTE and new radio (NR);

formatting downlink control information for an NR user equipment according to an NR downlink control information format to form formatted downlink control information;

coding the formatted downlink control information according to an NR physical downlink control channel (PDCCH) to form encoded downlink control information;

scrambling the encoded downlink control information according to an NR PDCCH scrambling to form scrambled downlink control information;

modulating the scrambled downlink control information according to an NR PDCCH modulation to form modulated downlink control information;

using the LTE resource element mapping to map the modulated downlink control information to a second plurality of resource elements in the shared control region; and transmitting the first plurality of resource elements and the second plurality of resource elements to the NR user equipment, wherein transmitting the first plurality of resource elements comprises transmitting the first plurality of resource elements through at least a first antenna port and a second antenna port, and wherein transmitting the second plurality of resource elements comprises transmitting the second plurality of resource elements through at least the first antenna port and the second antenna port according to a precoding combination.

8. The method of claim 7, further comprising:
cycling the precoding combination for each resource element group in the second plurality of resource elements.

9. The method of claim 7, further comprising
cycling the precoding combination for each physical resource block in the second plurality of resource elements.

10. The method of claim 7, further comprising:
cycling the precoding combination responsive to at least one of a system bandwidth, a symbol size of the encoded downlink control information, a cell identification, and a control resource identification.

11. A base station, comprising:
a processor configured to control:
a mapping of a plurality of long term evolution (LTE) pilot signals according to an LTE resource element mapping to a first plurality of resource elements in a shared control region that is shared between LTE and new radio (NR);

a formatting of NR downlink control information for an NR user equipment according to an NR downlink control information format to form formatted downlink control information;

a coding of the formatted downlink control information according to an NR physical downlink control channel (PDCCH) coding to form encoded downlink control information;

a scrambling of the encoded downlink control information according to an NR PDCCH scrambling to form scrambled downlink control information;

a modulation of the scrambled downlink control information according to an NR PDCCH modulation to form modulated downlink control information;

a mapping of the modulated downlink control information to a second plurality of resource elements in the shared control region according to the LTE resource element mapping; and a transceiver configured to transmit the first plurality of resource elements and the second plurality of resource elements to the NR user equipment, wherein the transceiver is further configured to transmit the first plurality of resource elements through at least a first antenna port and a second antenna port and to transmit the second plurality of resource elements through at least the first antenna port and the second antenna port according to a precoding combination.

12. The base station of claim 11, wherein the processor is further configured to control:
a mapping of the plurality of LTE pilot signals to a first transmission layer and to a second transmission layer, and a mapping of the modulated downlink control information to only the first transmission layer.

* * * * *